United States Patent
Fujiwara et al.

(10) Patent No.: US 6,958,554 B2
(45) Date of Patent: Oct. 25, 2005

(54) RECIPROCATING LINEAR ACTUATOR

(75) Inventors: Makoto Fujiwara, Hirakata (JP); Satoshi Nakayama, Hirakata (JP); Wataru Sanematsu, Hirakata (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 10/490,393
(22) PCT Filed: Oct. 28, 2002
(86) PCT No.: PCT/JP02/11182
§ 371 (c)(1), (2), (4) Date: Apr. 6, 2004
(87) PCT Pub. No.: WO03/036780
PCT Pub. Date: May 1, 2003

(65) Prior Publication Data
US 2005/0001491 A1 Jan. 6, 2005

(30) Foreign Application Priority Data
Oct. 26, 2001 (JP) ........................ 2001-329936

(51) Int. Cl.[7] ........................ H02K 33/04; H02K 33/16; B26B 19/28
(52) U.S. Cl. ........................................ 310/36
(58) Field of Search .................. 310/12, 15, 17, 310/36, 38

(56) References Cited

U.S. PATENT DOCUMENTS

| | | | |
|---|---|---|---|
| 5,557,850 A | | 9/1996 | Mun .................. 30/43.91 |
| 5,632,087 A | * | 5/1997 | Motohashi et al. ......... 30/43.92 |
| 2004/0046461 A1 | * | 3/2004 | Shimizu et al. |

FOREIGN PATENT DOCUMENTS

| | | | |
|---|---|---|---|
| DE | 19531013 | 10/1996 | ........... B26B/19/10 |
| JP | 07-313746 | 12/1995 | ........... B26B/19/04 |
| JP | 08-322225 | 12/1996 | ........... H02K/33/16 |
| JP | 11-136920 | 5/1999 | ........... H02K/33/04 |
| JP | 11-136921 | 5/1999 | ........... H02K/33/04 |
| WO | 95/026261 | 10/1995 | ........... B26B/19/28 |
| WO | 97/07942 | 3/1997 | ........... B26B/19/10 |

OTHER PUBLICATIONS

English Language Abstract of JP 11-136920.
English Language Abstract of JP 08-322225.
English Language Abstract of JP 07-313746.
English Language Abstract of JP 11-136921.

* cited by examiner

Primary Examiner—Darren Schuberg
Assistant Examiner—Judson H. Jones
(74) Attorney, Agent, or Firm—Greenblum & Bernstein, P.L.C.

(57) ABSTRACT

A reciprocating linear actuator capable of reciprocatingly driving a plurality of movable elements (2 and 2) by a single stator (1). The movable elements (2 and 2) are connected to each other through a connection body (3) having a spring characteristic to be capable of displacement in the reciprocating direction of the movable element. The connection body (3) has such a shape that can be drawn with a single stroke on a two dimensional plane, and at least both ends thereof are connected to the movable elements (2 and 2), respectively. Since the connection body (3) is made of a flat spring, it requires less space for installation as compared to a connection body formed of a coiled spring. Further, since the entire connection body has an effective spring characteristic, a relatively smaller size is required for the connection body to provide a required spring characteristic. The less installation space for the connection body (3) is advantageous to a reduction in size of the linear actuator.

17 Claims, 12 Drawing Sheets

RECIPROCATING LINEAR ACTUATOR

TECHNICAL FIELD

The present invention relates to a reciprocating linear actuator that can be used as a drive source for a reciprocatory electric shaver or the like.

BACKGROUND ART

Reciprocating linear actuators have been used as a drive source for a reciprocatory electric shaver (see, for example, Japanese laid-open patent publication No. HEI 7-313746). Such a reciprocating linear actuator (reciprocating motor) includes a stator and a plurality of movable elements that perform a reciprocating motion relative to the stator. The plurality of movable elements are associated with respective movable cutters of a plurality of cutter heads and configured to be driven by the single stator. Disposed between the plurality of movable elements is a connection body formed of a coiled spring. When reciprocating displacement amount of one of the movable elements is going to abruptly decrease due to a heavy load applied thereto, the connection body allows the decrease to be stopped by the other movable element, thus preventing a decrease in reciprocating displacement amount of only one of the movable elements so as to provide a well-balanced uniform amplitude.

However, the construction in which the connection body formed of the coiled spring is disposed between the movable elements requires a considerable space, thus making it difficult to reduce the size of the reciprocating linear actuator.

In another linear actuator, movable elements are connected by a connection body that is a flat spring displaceable in the reciprocating direction of the movable elements (see, for example, Japanese laid-open patent publication No. HEI 11-136921). This construction can require less space for the connection body as compared to that using the connection body formed of the coiled spring. However, the connection body formed of the flat spring disclosed therein has an E-shaped configuration in which one end of each of three flat spring pieces substantially parallel to each other is connected to the movable element while the other ends are linked together. Therefore, the spring characteristic of the portion for linking the plurality of flat spring pieces is inferior to that of the flat spring pieces. On the whole, the portion of the connection body that has an effective spring characteristic is short as compared to the overall length (size) thereof. Thus, for a desired spring characteristic, a large flat spring is required on the whole, so that it is difficult to reduce the size.

The present invention has been developed in view of the above mentioned problems, and it is an object of the present invention to provide a reciprocating linear actuator in which a resilient connection body requiring relatively less space for installation is employed for connecting movable elements so as to be advantageous to reduction in size of the actuator.

DISCLOSURE OF THE INVENTION

In order to achieve the above purpose, an aspect of the present invention provides a reciprocating linear actuator having a plurality of movable elements capable of reciprocating motion and a stator causing the movable elements to reciprocate, comprising a connection body connecting the movable elements and having a spring characteristic to be capable of displacement in a reciprocating direction of the movable element, wherein the connection body has such a shape that can be drawn with a single stroke on a two dimensional plane, and at least both ends of the connection body are connected to the movable elements, respectively.

In this configuration, since the connection body is formed of a flat spring, it requires less space for installation as compared to that formed of a coiled spring. Further, since the entire connection body has an effective spring characteristic, a relatively smaller size is required for the connection body to provide a required spring characteristic. Accordingly, the actuator can be reduced in size.

In the improved actuator described above, the two dimensional plane may be a plane orthogonal to the reciprocating direction of the movable element. This can decrease the dimension in the plane orthogonal to the reciprocating direction.

The connection body may have a symmetrical shape. In this configuration, the movable element can perform a well-balanced reciprocating motion with relatively less variation.

In one embodiment, the connection body is symmetrical about a line, which causes the connection body to be free in mounting and thus facilitates the assembling.

The connection body may be symmetrical about a point. In such a embodiment, the directions in which the connection body extends from the movable elements are opposite to each other. Therefore, when the movable element changes its position in the reciprocating direction, it moves in the extending direction of the connection body while the connection body changes the shape. Thus, even when the distance between the movable element and the stator changes, the distance between one of the movable elements and the stator increases as that between the other movable element and the stator decreases, so that the performance can be stable on the whole.

The connection body may have a shape formed by a continuous curved line. In this configuration, stress concentration on a corner can be prevented and thus the connection body can be improved in reliability.

Preferably, the connection body is disposed at ends of the movable elements in the reciprocating direction. This can facilitate the assembling.

Connection bodies may be disposed at both ends of the movable elements in the reciprocating direction, respectively. This can decrease stresses generated on the connection body as compared to the case where the connection body is disposed at only one side, thus allowing the movable element to perform a motion with relatively less variation.

Preferably, the connection bodies are connected to the movable elements on alignment planes of the movable elements so as to be symmetrical about a middle point between the movable elements. This allows the movable elements to perform a well-balanced reciprocating motion with relatively less variation.

Mounting positions of the connection body to the respective movable elements may be on reciprocating directions of centers of gravity of the movable elements. This allows the movable elements to perform a well-balanced reciprocating motion with relatively less variation as well as preventing rotational moment and accompanying stress from being generated on the connection body when the movable element changes its position in the reciprocating direction, and thus to enhance the reliability of the connection body.

Mounting positions of the connection body to the respective movable elements may be on alignment planes of the movable elements at a uniform distance from centers of gravity of the respective movable elements or may be on a plane that is orthogonal to alignment planes of the movable elements and parallel to the reciprocating direction as well as including centers of gravity of the movable elements, at a uniform distance from the centers of gravity of the respective movable elements. In such a configuration, even when the mounting position fails to be on the reciprocating direction of the center of gravity of the movable element due to the shape of the connection body, the movable elements can perform well-balanced reciprocating motions with relatively less variation At least two connection bodies may be coupled at each end of the movable element with one of two turned over. In other words, a reversed connection body and a non-reversed connection body are coupled together. This allows the movable elements to perform well-balanced reciprocating motions with relatively less variation.

At least two connection bodies may be coupled at each end of the movable element, the plurality of connection bodies being identical in shape and orientation. This can prevent an interference between adjacent connection bodies when the movable element changes its position in the reciprocating direction, thus allowing the distance between the connection bodies to be decreased.

The two dimensional plane may be a plane orthogonal to alignment planes of the movable elements. In this configuration, the dimension in the plane parallel to the alignment planes of the movable elements can decrease.

The two dimensional plane may be a plane orthogonal to alignment planes of the movable elements and parallel to the reciprocating direction. In this configuration, the actuator can be decreased in dimension in the plane orthogonal to the alignment planes of the movable elements and parallel to the reciprocating direction.

Preferably, the movable element in the reciprocating linear actuator has an permanent magnet and is suspended from a chassis with a suspension piece made of a flat spring in a manner such that the permanent magnet and the stator face each other.

BEST MODES FOR EMBODYING THE INVENTION

Figure 1:
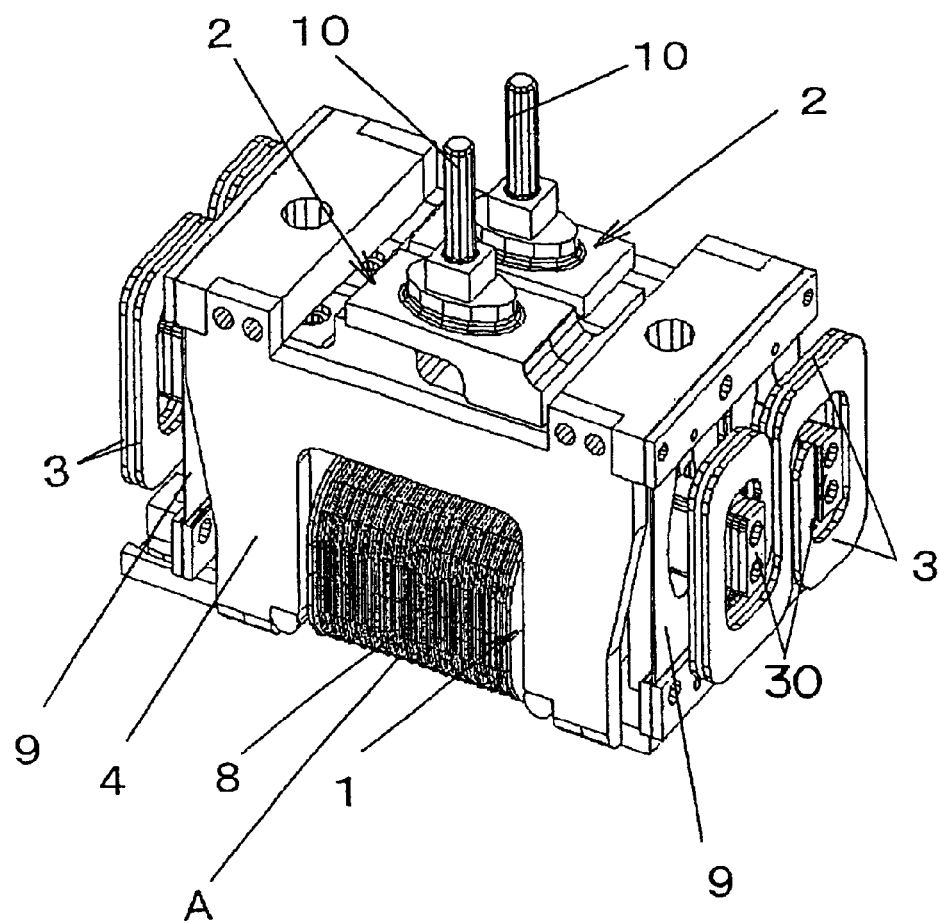
FIG. 1 is a perspective view of a reciprocating linear actuator according to Embodiment 1 of the present invention.
Figure 2:
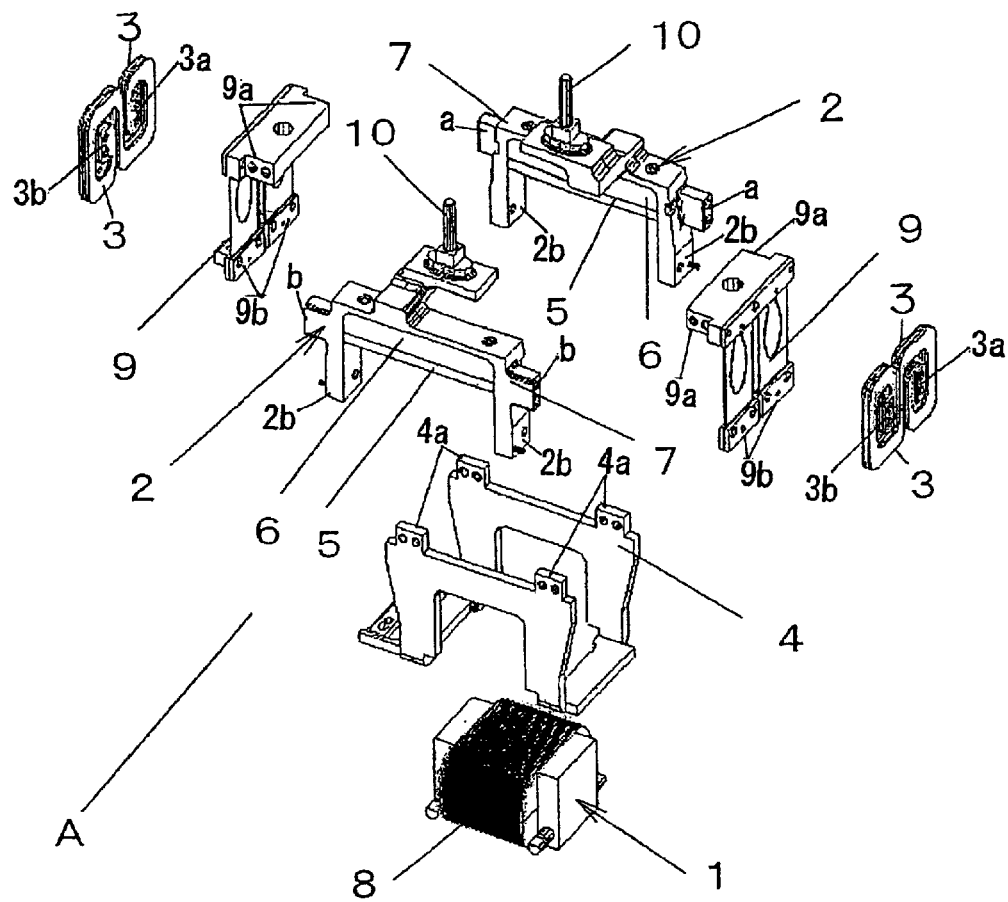
FIG. 2 is an exploded perspective view of the same.

A reciprocating linear actuator embodying the present invention will be now described.
(Embodiment 1)

FIGS. 1 to 4 show a reciprocating linear actuator A, which is used as a drive source for a reciprocatory electric shaver, according to Embodiment 1. This actuator A comprises a stator 1, movable elements 2, a chassis 4, and a connection body 3 connecting the two movable elements 2 and 2.

The movable element 2 has a permanent magnet 5 and a yoke 6 (back yoke), which are constructed as a unit with a frame member 7. The permanent magnet 5 is bonded to the yoke 6 which is formed from a magnetic material. Further, the movable element 2 has a connection portion 10 to which the movable cutter of an electric shaver is connected.

The stator 1 is an electromagnet in which a winding 8 is wound around a core, which is a sintered body of magnetic material or a laminated core of iron as magnetic material, and the stator is secured to the chassis 4 with a screw or the like.

The movable element 2 is suspended from the chassis 4 via a suspension piece 9 made of a flat spring in a manner such that the permanent magnet 5 and the stator 1 faces each other with a gap therebetween. The upper end 9a of the suspension piece 9 is secured to the upper end 4a of the chassis 4 with a screw or the like while the lower end 9b of the suspension piece is secured to the lower end 2b of the movable element 2 with a screw or the like.

In this embodiment, as shown in the drawings, two movable elements 2 and 2 identical in shape are in parallel and opposite orientation. When the directions of current to the electromagnet or stator 1 are made alternating, the movable element 2 suspended with the resilient suspension pieces 9 and 9 reciprocates (or oscillates) while causing the suspension pieces 9 to be bent, because the movable element has the permanent magnet 5 moving due to attracting/repelling forces relative to the stator 1 or electromagnet. In the case where the stator 1 or electromagnet has a single winding 8, the current direction applied to the winding 8 is reversed depending on the direction of the reciprocating motion, rightward or leftward. In other words, the movable element 2 is caused to reciprocate by a current flowing in a direction such that a thrust is produced in a direction of movement.

Further, if the movable elements 2 reciprocate with a phase difference of 180 degrees, the movement in the reciprocating direction can be decreased. Therefore, in this embodiment, the permanent magnets 5 of the two movable elements 2 are opposite in polarity such that the movable elements 2 and 2 can reciprocate with opposite phases.

The two movable elements 2 and 2 are connected to each other through the connection body 3 having a spring characteristic in the reciprocating direction of the movable elements 2. Used as the connection body 3 in this embodiment is a flat spring having such a shape that can be drawn with a single stroke on a two dimensional plane orthogonal to the reciprocating direction of the movable element (S-shaped configuration in the example shown in the drawings). One end 3a of the flat spring is connected to an end a of one of the movable elements 2 while the other end 3b is connected to an end b of the other movable element 2. Further, this embodiment employs four connection bodies 3, i.e., two at each side of the set of the movable elements 2 and 2 in the reciprocating direction. When reciprocating displacement amount of one of the movable elements 2 is going to abruptly decrease due to a heavy load applied thereto, the connection body 3 allows the decrease to be stopped by movement of the other movable element 2, thus preventing a decrease in reciprocating displacement amount of only one of the movable elements so as to consistently provide a well-balanced uniform amplitude. It should be noted that the connection body 3 can serve as an inherent frequency setting spring for maintaining the inherent frequency of reciprocation of each of the movable elements 2.

The connection body 3, which is the S-shaped flat spring, requires less space as compared to that made of a coiled spring, thus contributing to reduction in size of the reciprocating linear actuator A. Further, since the overall length of the connection body 3 can efficiently function as a spring portion, a required spring length can be secured with a small flat spring. This is also advantageous to size reduction.

As described above, the connection body 3 in the embodiment shown in FIGS. 1 to 4 has such a shape that can be drawn with a single stroke on the two dimensional plane orthogonal to the reciprocating direction of the movable elements 2. This allows the linear actuator A to decrease in dimensions at the side orthogonal to the reciprocating direction of the movable elements 2. Moreover, the S-shaped configuration, which is symmetrical about a point, allows reciprocating motion of the movable elements 2 to be well-balanced with relatively less variation. The symmetrical configuration causes the directions in which the connection body 3 extends from the movable elements 2 to be opposite to each other. Therefore, when the movable element 2 changes its position in the reciprocating direction, it moves in the extending direction of the connection body 3 while the connection body 3 changes the shape. Thus, even when the distance between the stator 1 and each of the movable elements 2 changes, the distance between one of the movable elements 2 and the stator 1 increases as that between the other movable element 2 and the stator 1 decreases, so that the performance can be stable on the whole.

Figure 3:
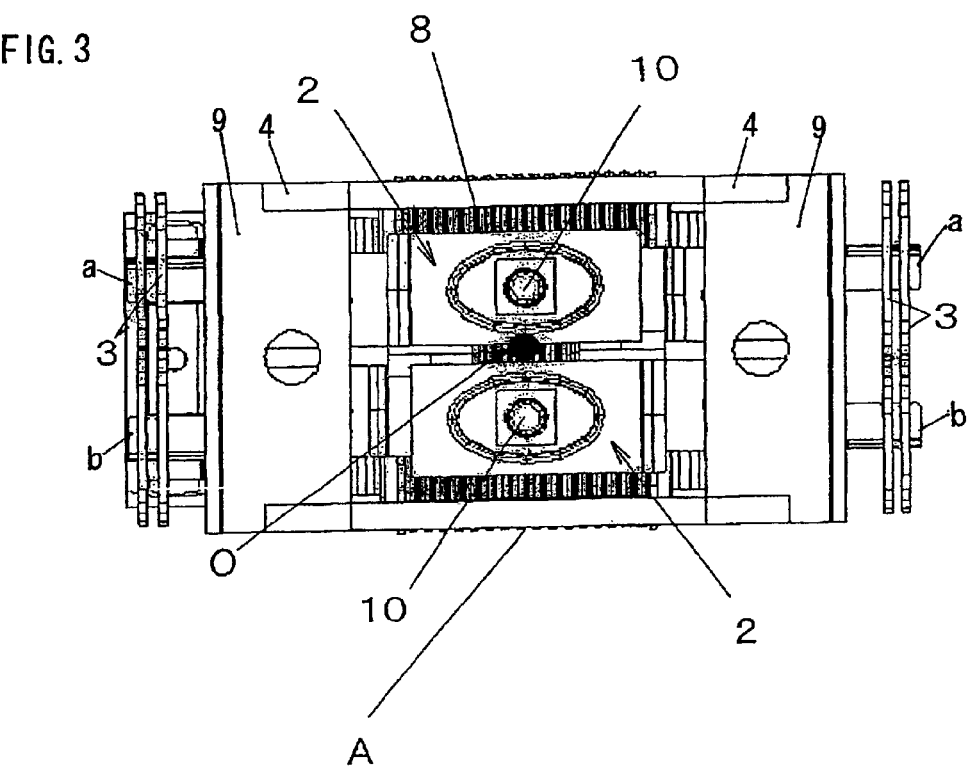
FIG. 3 is a plan view of the same.
Figure 4:
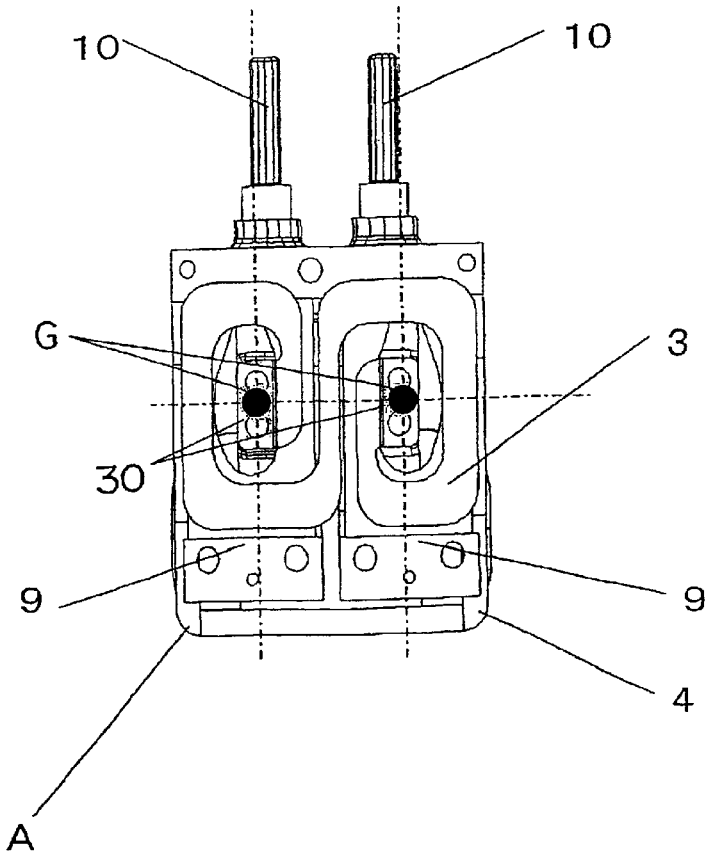
FIG. 4 is a side view of the same.

The connection bodies 3 are provided at both ends of the set of the movable elements 2 and 2 in the reciprocating direction and connected on alignment planes (vertical broken lines in FIG. 4) of the two movable elements 2 so as to be symmetrical about the middle point O between the two movable elements 2 (see FIG. 3). This can facilitate assembling of the connection body 3 as well as decreasing stresses generated on the connection body 3 as compared to the case where the movable elements 2 are connected each other at only one end with the connection body 3. Accordingly, reciprocating motions of the movable elements 2 can be easily well-balanced with relatively less variation.

The mounting position 30 (see FIG. 4) of the connection body 3 to the movable element 2 is on the reciprocating direction of the center of gravity G (denoted by a solid circle) of the movable element 2. This can prevent rotational moment and accompanying stress from being generated on the connection body 3 when the movable element 2 changes its position in the reciprocating direction, thus enhancing the reliability of the connection body 3.

Further, at each side, a plurality of connection bodies 3 (two in this embodiment, as described above), which are identical in shape, are coupled in the same orientation. This can prevent an interference between adjacent connection bodies 3 and 3 when the movable elements 2 and 2 reciprocate with opposite phases, thus allowing the distance between the connection bodies 3 to be decreased for size reduction.

(Embodiment 2)

Figure 5:
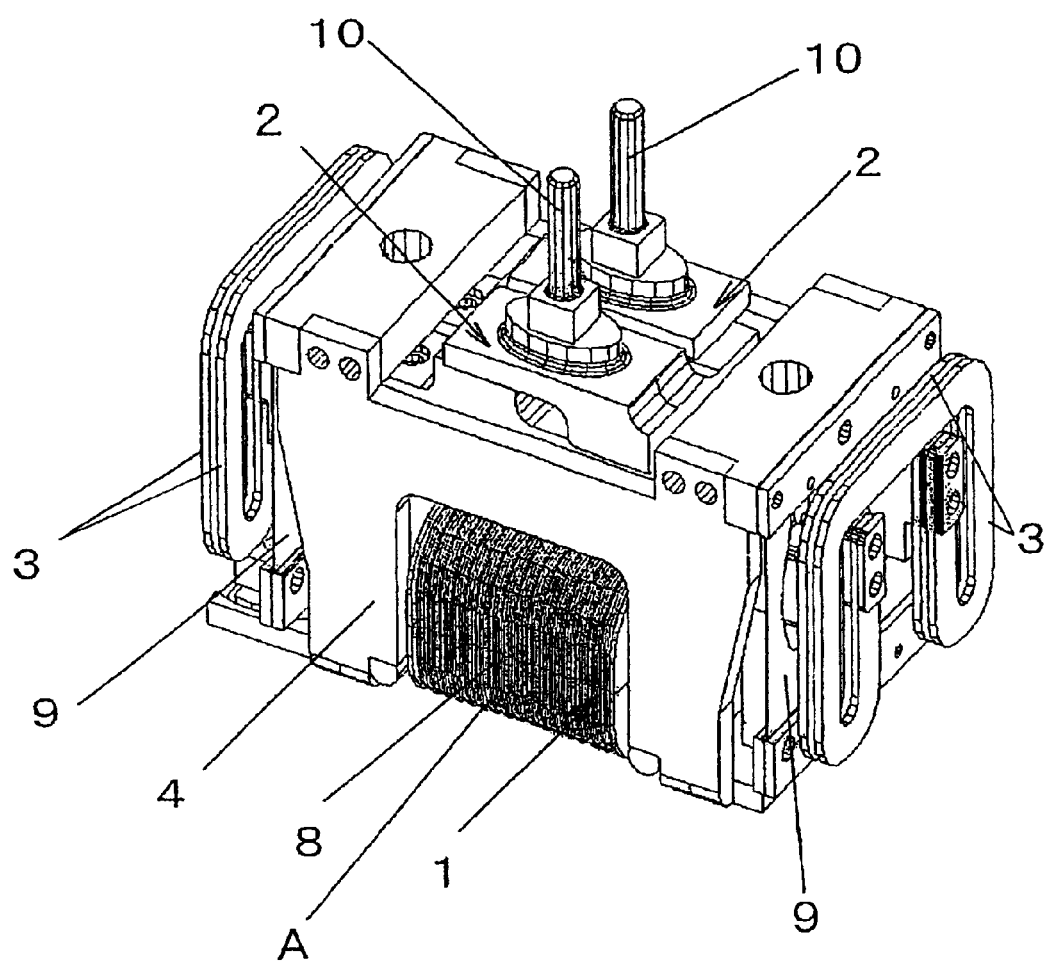
FIG. 5 is a perspective view of an actuator according to Embodiment 2.
Figure 6:
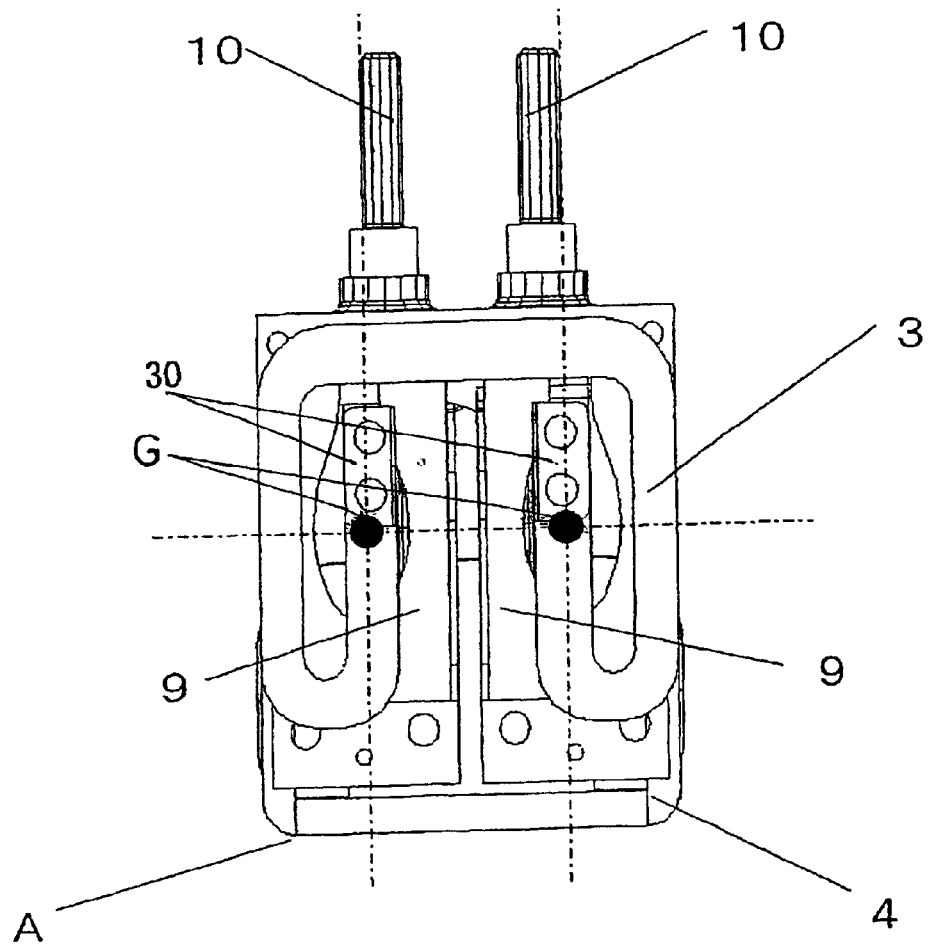
FIG. 6 is a side view of the same.

FIGS. 5 and 6 show a reciprocating linear actuator according to Embodiment 2. A connection body 3 used in this embodiment is a reverse U-shaped flat spring of which the two ends further extends inward to be connected to the respective movable elements 2 and 2. This connection body 3 also has such a shape that can be drawn with a single stroke on a plane orthogonal to the reciprocating direction of the movable element 2. While the S-shaped connection body in the above embodiment is symmetrical about a point, the connection body 3 in this embodiment is symmetrical about a line, so that it is not directional in shape for facilitating the assembling. The mounting positions 30 of the connection body 3 to the respective movable elements 2 are on the alignment planes of the movable elements 2 at a uniform distance from the centers of gravity G of the respective movable elements 2. Although the mounting position 30 of the connection body 3 is not on the reciprocating direction of the center of gravity G of the movable element 2, the above configuration allows the movable elements 2 to perform well-balanced reciprocating motions with relatively less variation.

(Embodiment 3)

Figure 7:
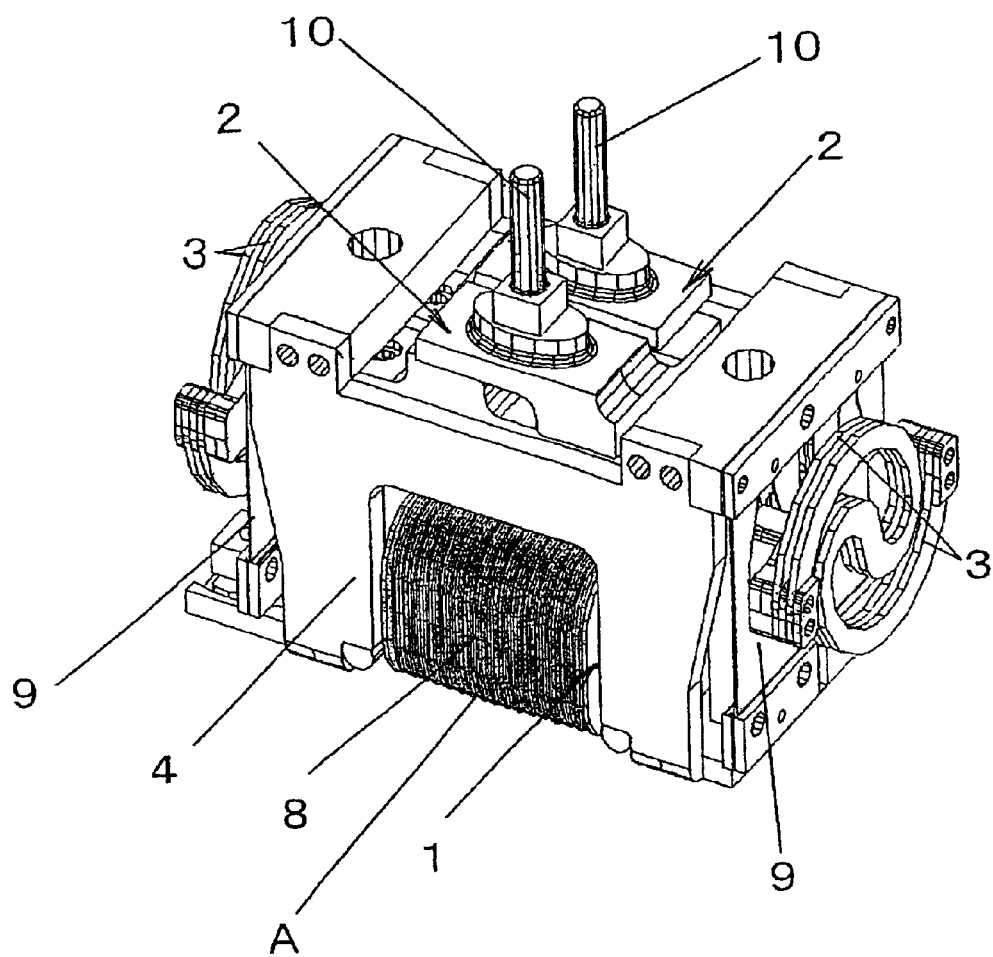
FIG. 7 is a perspective view of an actuator according to Embodiment 3.
Figure 8:
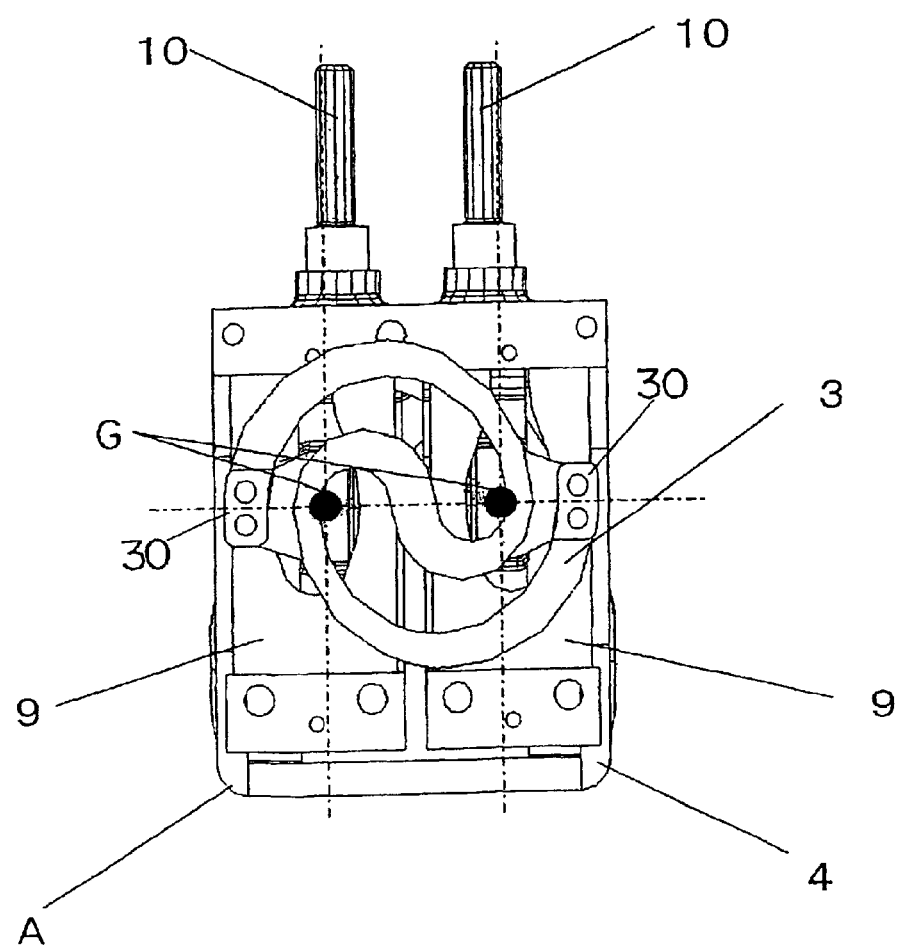
FIG. 8 is a side view of the same.

FIGS. 7 and 8 show a reciprocating linear actuator according to Embodiment 3. A connection body 3 used in this embodiment has a S-shaped configuration, in which the two arched ends extend circumferentially to be connected to the respective movable elements 2 and 2. This connection body 3 has such a shape that can be drawn with a single stroke on a plane orthogonal to the reciprocating direction of the movable element 2. The mounting positions 30 of the connection body 3 to the respective movable elements 2 are on the plane (horizontal broken line in FIG. 8) that is orthogonal to the alignment plane of the movable element 2 and parallel to the reciprocating direction as well as including the centers of gravity G of the two movable elements 2. Further, the mounting positions are at a uniform distance from the centers of gravity G of the respective movable elements 2. Although the mounting position 30 of the connection body 3 is not on the reciprocating direction of the center of gravity G of the movable element 2, the above configuration allows the movable elements 2 to perform well-balanced reciprocating motions with relatively less variation. Besides, since this connection body 3 is entirely formed by a continuous curved line, stress concentration on a corner can be prevented and thus the connection body 3 can be improved in reliability.

(Embodiment 4)

Figure 9:
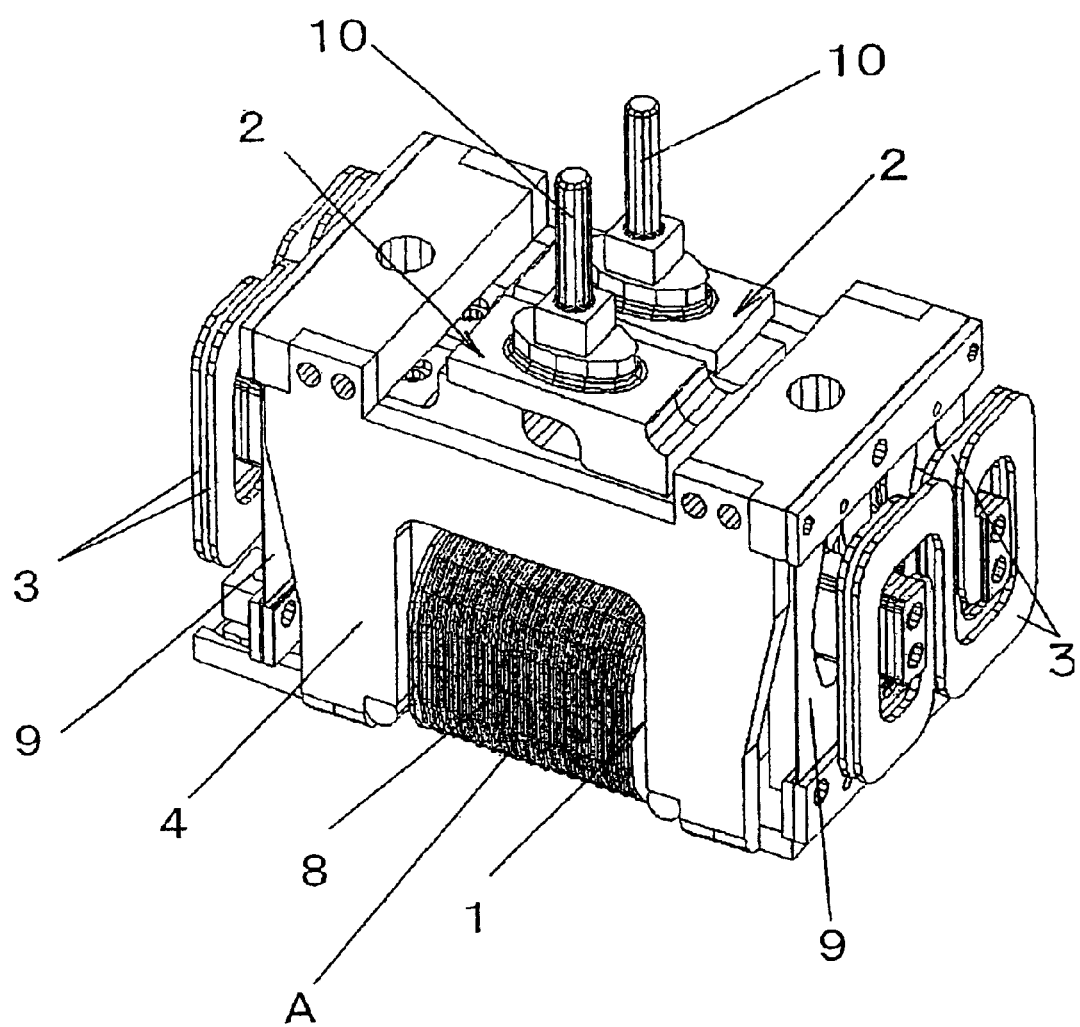
FIG. 9 is a perspective view of an actuator according to Embodiment 4.

FIG. 9 shows a reciprocating linear actuator according to Embodiment 4. This embodiment is similar to that shown in FIG. 1 but has one of two connection bodies 3 and 3, at each end of a set of movable elements 2, turned over to be connected to the movable elements 2 and 2. In other words, a reversed one and a non-reversed one are coupled together. This allows reciprocating motions of the movable elements 2 to be easily well-balanced with relatively less variation. It should be noted that this embodiment requires longer distance between the connection bodies 3 and 3 as compared to the embodiment shown in FIG. 1 where the connection bodies identical in shape are coupled in the same orientation, in order to prevent an interference between two adjacent connection bodies 3 and 3 that may arise when the movable elements 2 reciprocate.

(Embodiment 5)

Figure 10:
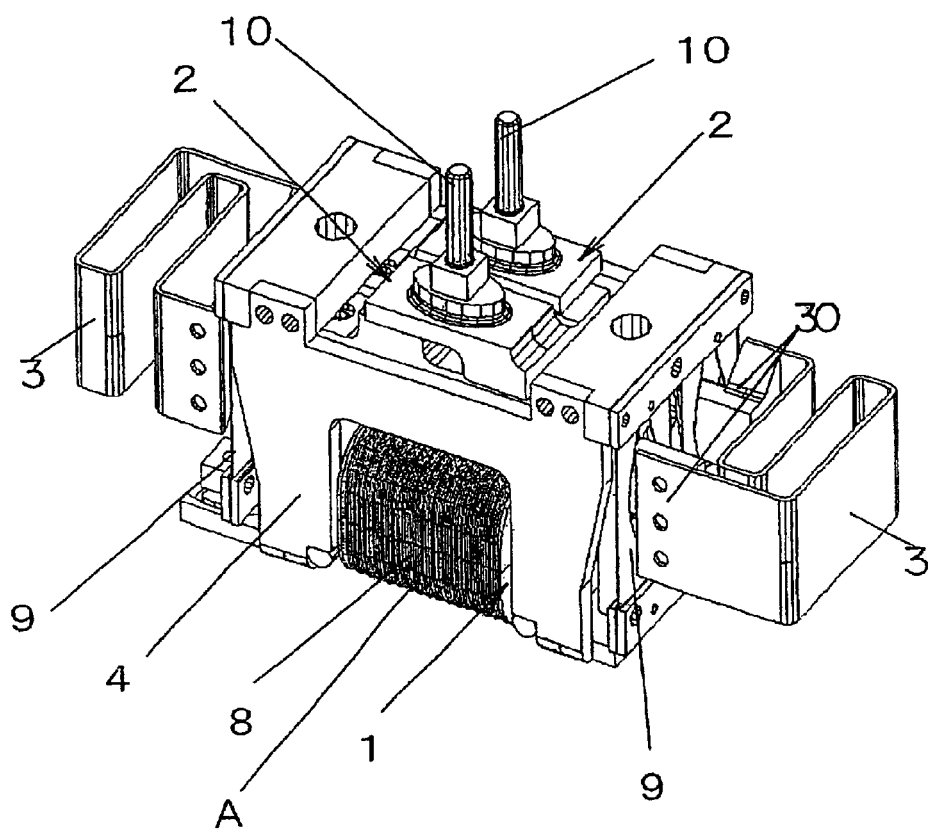
FIG. 10 is a perspective view of an actuator according to Embodiment 5.
Figure 11:
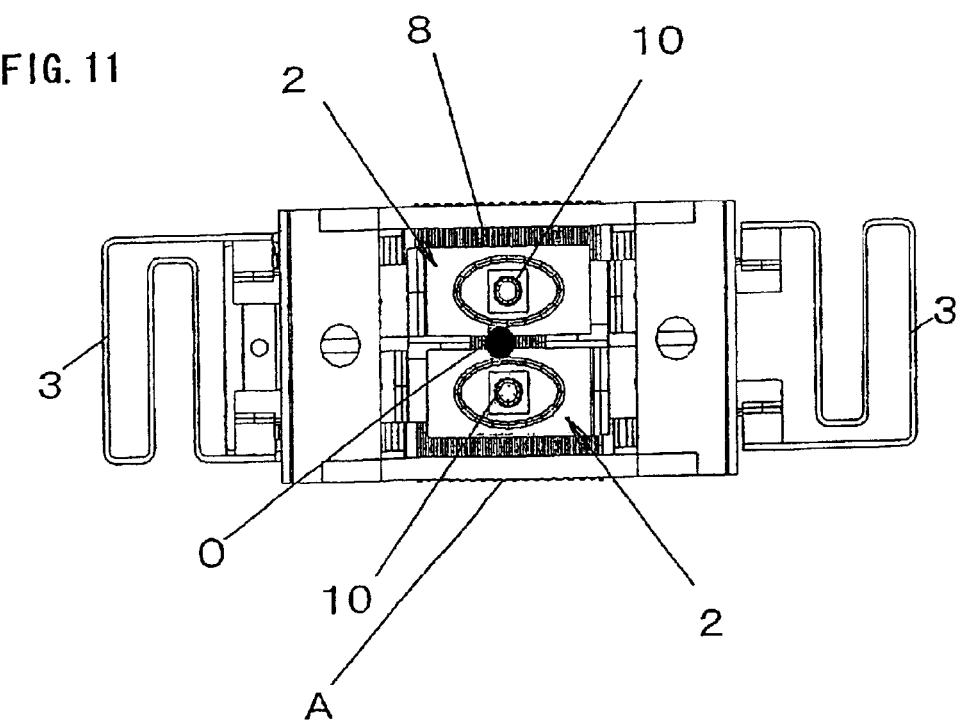
FIG. 11 is a plan view of the same.
Figure 12:
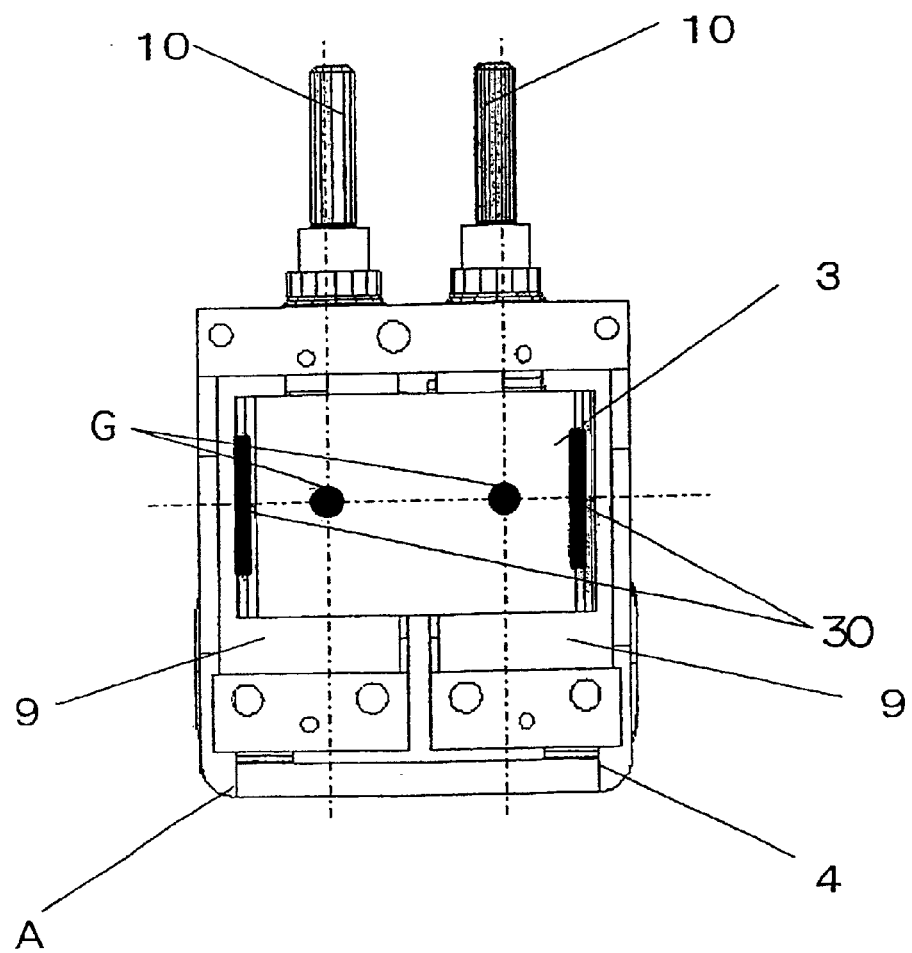
FIG. 12 is a side view of the same.

FIGS. 10, 11, and 12 show a reciprocating linear actuator according to Embodiment 5. This embodiment uses as a connection body 3 a flat spring having such a shape that can be drawn with a single stroke on a plane orthogonal to the alignment planes of the two movable elements 2. In this case, although the dimension in the reciprocating direction of the movable element 2 increases, the dimension in the plane parallel to the alignment planes of the two movable elements 2 and 2 (height) can decrease.

The connection bodies 3 are connected to the movable elements 2 and 2 on the alignment planes of the two movable elements 2 in a manner such that they are symmetrical about the middle point O between the two movable elements 2. Therefore, although each of the connection bodies 3 has an asymmetrical shape, the movable elements 2 can perform well-balanced reciprocating motions with relatively less variation.

The mounting positions 30 of the connection body 3 to the respective movable elements 2 are on the alignment planes of the movable elements 2 at a uniform distance from the centers of gravity G of the respective movable elements 2. This allows the movable elements 2 to perform well-balanced reciprocating motions with relatively less variation although the mounting position 30 is not on the reciprocating direction of the center of gravity G of the movable element 2.

(Embodiment 6)

Figure 13:
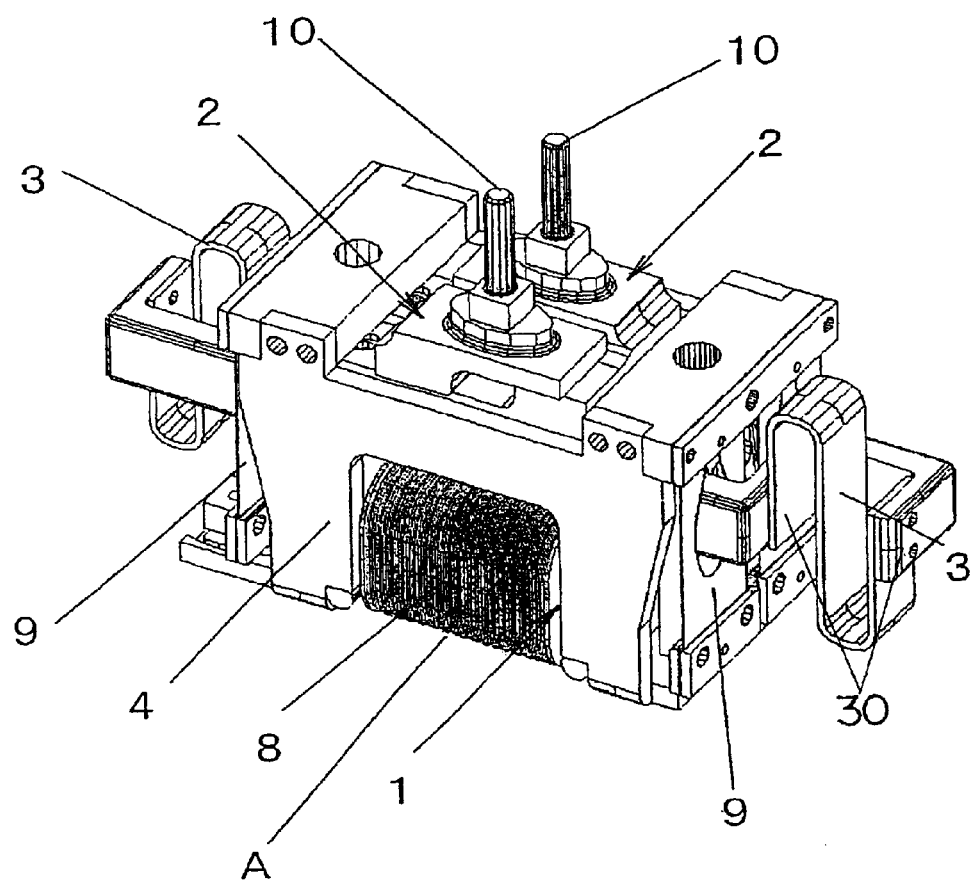
FIG. 13 is a perspective view of an actuator according to Embodiment 6.
Figure 14:
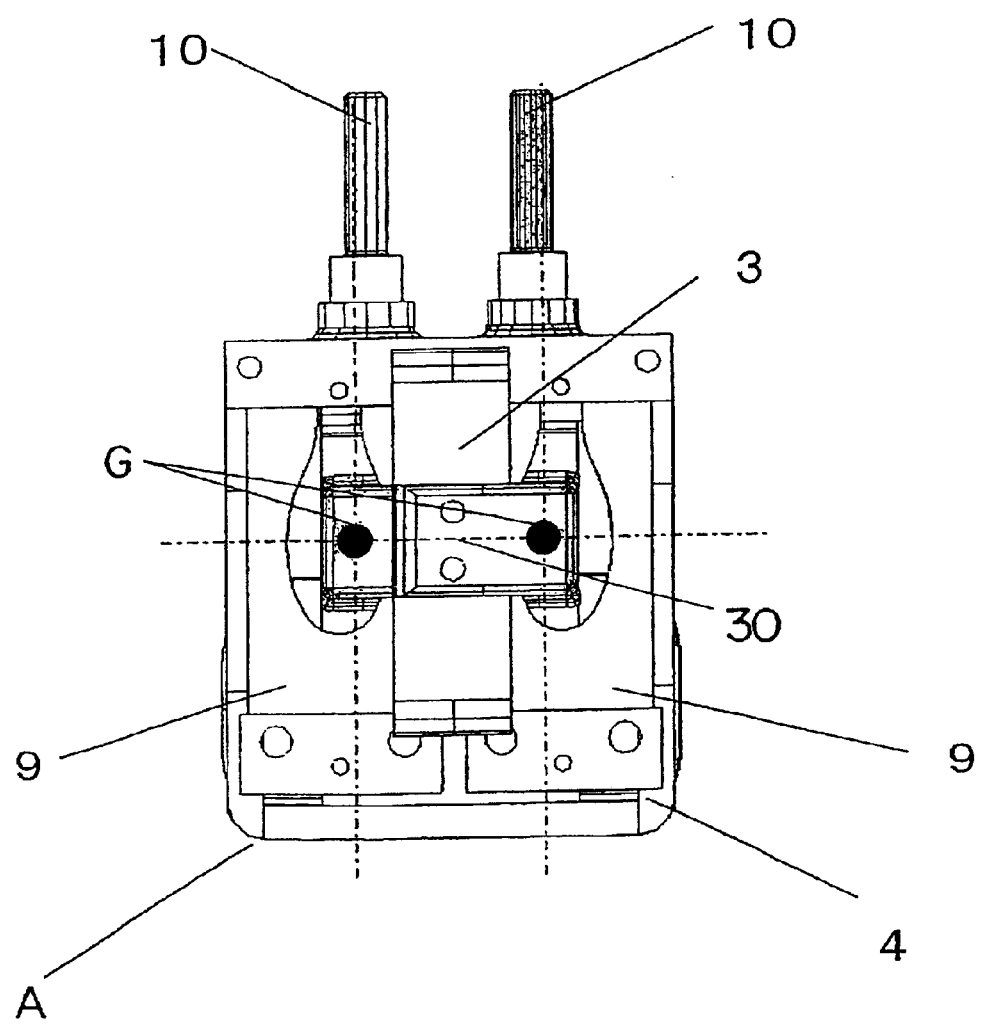
FIG. 14 is a side view of the same.

FIGS. 13 and 14 show a reciprocating linear actuator according to Embodiment 6. A connection body 3 in this embodiment has S-shape that can be drawn with a single stroke on the plane that is orthogonal to the alignment planes of two movable elements 2 and parallel to the reciprocating direction. The two ends of the connection body are connected to the respective movable elements 2 and 2. This configuration can decrease the dimension in the plane orthogonal to the alignment planes of the two movable elements 2 and parallel to the reciprocating direction.

The mounting positions 30 of the connection body 3 to the respective movable elements 2 are on the alignment planes of the movable elements 2 at a uniform distance from the centers of gravity G of the respective movable elements 2. This allows the movable elements 2 to perform well-balanced reciprocating motions with relatively less variation although the mounting position 30 is not on the reciprocating direction of the center of gravity G of the movable element 2.

The above embodiments use two movable elements 2, but more than three movable elements may be used. In such a case, preferably, a connection body 3 is connected to the additional movable element 2 in a manner such that the mounting positions 30 are at regular intervals along a shape of the connection body 3 that can be drawn with a single stroke.

The actuators suitable for use as a drive source for a reciprocatory electric shaver are illustrated in the above description, but the reciprocating linear actuators according to the present invention can be used not only as a drive source for a reciprocating electric shaver but also as drive sources for other various apparatus.

This application is based on Japanese patent application filed on Oct. 26, 2001, the contents of which are hereby incorporated by references.

Industrial Applications

The present invention is applicable to small drive sources for electrical apparatus that cause the apparatus to perform a reciprocating motion.

What is claimed is:

1. A reciprocating linear actuator having a plurality of movable elements capable of reciprocating motion and a stator causing the movable elements to reciprocate, comprising:

a connection body connecting the movable elements and having a spring characteristic to be capable of displacement in a reciprocating direction of the movable element, wherein the connection body has a shape formed by either continuous straight lines and curved lines or a continuous curved line on a two dimensional plane, and at least both ends of the connection body are connected to the movable elements, respectively.

2. The reciprocating linear actuator according to claim 1, wherein the two dimensional plane is a plane orthogonal to the reciprocating direction of the movable element.

3. The reciprocating linear actuator according to claim 2, wherein the connection body has a symmetrical shape.

4. The reciprocating linear actuator according to claim 3, wherein the connection body is symmetrical about a line.

5. The reciprocating linear actuator according to claim 3, wherein the connection body is symmetrical about a point.

6. The reciprocating linear actuator according to claim 3, wherein the connection body has a shape formed by a continuous curved line.

7. The reciprocating linear actuator according to claim 1, wherein the connection body is disposed at ends of the movable elements in the reciprocating direction.

8. The reciprocating linear actuator according to claim 1, wherein connection bodies are disposed at both ends of the movable elements in the reciprocating direction, respectively.

9. The reciprocating linear actuator according to claim 8, wherein the connection bodies are connected to the movable elements on alignment planes of the movable elements so as to be symmetrical about a middle point between the movable elements.

10. The reciprocating linear actuator according to claim 1, wherein mounting positions of the connection body to the respective movable elements are on reciprocating directions of centers of gravity of the movable elements.

11. The reciprocating linear actuator according to claim 1, wherein mounting positions of the connection body to the respective movable elements are on alignment planes of the movable elements at a uniform distance from centers of gravity of the respective movable elements.

12. The reciprocating linear actuator according to claim 1, wherein mounting positions of the connection body to the respective movable elements are on a plane that is orthogonal to alignment planes of the movable elements and parallel to the reciprocating direction as well as including centers of gravity of the movable elements, and the mounting positions are at a uniform distance from the centers of gravity of the respective movable elements.

13. The reciprocating linear actuator according to claim 1, wherein at least two connection bodies are coupled at each end of the movable element with one of two connection bodies turned over.

14. The reciprocating linear actuator according to claim 1, wherein at least two connection bodies are coupled at each end of the movable element, and the plurality of connection bodies are identical in shape and orientation.

15. The reciprocating linear actuator according to claim 1, wherein the two dimensional plane is a plane orthogonal to alignment planes of the movable elements.

16. The reciprocating linear actuator according to claim 1, wherein the two dimensional plane is a plane orthogonal to alignment planes of the movable elements and parallel to the reciprocating direction.

17. The reciprocating linear actuator according to claim 1, wherein the movable element has an permanent magnet and is suspended from a chassis with a suspension piece made of a flat spring in a manner such that the permanent magnet and the stator face each other.

* * * * *